United States Patent
Liu et al.

(10) Patent No.: US 12,450,412 B2
(45) Date of Patent: Oct. 21, 2025

(54) METHOD AND SYSTEM FOR DETERMINING EQUIVALENCE OF DESIGN RULE MANUAL DATA AND DESIGN RULE CHECKING DATA

(71) Applicant: TAIWAN SEMICONDUCTOR MANUFACTURING COMPANY LTD., Hsinchu (TW)

(72) Inventors: Chin-Chou Liu, Hsinchu County (TW); Yi-Kuang Lee, Hsinchu (TW); Lie-Szu Juang, Saratoga, CA (US)

(73) Assignee: TAIWAN SEMICONDUCTOR MANUFACTURING COMPANY LTD., Hsinchu (TW)

( * ) Notice: Subject to any disclaimer, the term of this patent is extended or adjusted under 35 U.S.C. 154(b) by 0 days.

(21) Appl. No.: 18/473,209

(22) Filed: Sep. 23, 2023

(65) Prior Publication Data
US 2024/0012971 A1    Jan. 11, 2024

Related U.S. Application Data

(63) Continuation of application No. 17/392,962, filed on Aug. 3, 2021, now Pat. No. 11,842,133, which is a continuation of application No. 16/847,386, filed on Apr. 13, 2020, now Pat. No. 11,120,186.

(60) Provisional application No. 62/908,017, filed on Sep. 30, 2019.

(51) Int. Cl.
*G06F 30/3323* (2020.01)
*G03F 1/70* (2012.01)
*G06F 30/392* (2020.01)
*G06F 40/20* (2020.01)
*G06F 111/04* (2020.01)
*G06F 111/10* (2020.01)
*G06F 119/16* (2020.01)

(52) U.S. Cl.
CPC .......... *G06F 30/3323* (2020.01); *G03F 1/70* (2013.01); *G06F 30/392* (2020.01); *G06F 40/20* (2020.01); *G06F 2111/04* (2020.01); *G06F 2111/10* (2020.01); *G06F 2119/16* (2020.01)

(58) Field of Classification Search
USPC .......................................... 716/55
See application file for complete search history.

(56) References Cited

U.S. PATENT DOCUMENTS

2015/0227672 A1* 8/2015 Zhang ............... G06F 30/398 716/112
2016/0283642 A1* 9/2016 Bhawnani ......... G06F 30/398

* cited by examiner

Primary Examiner — Bryce M Aisaka
(74) Attorney, Agent, or Firm — WPAT LAW; Anthony King

(57) ABSTRACT

The present disclosure provides a method and a system for determining the equivalence of the DRM data set and the DRC data set. The system retrieves a DRM data set and a DRC data set, and transforms the DRM data set and the DRC data set into a first data structure node and a second data structure node respectively. The system determines whether the first data structure node and the second data structure node are equivalent according to a data structure node comparison model.

20 Claims, 12 Drawing Sheets

METHOD AND SYSTEM FOR DETERMINING EQUIVALENCE OF DESIGN RULE MANUAL DATA AND DESIGN RULE CHECKING DATA

PRIORITY CLAIM AND CROSS-REFERENCE

This application is a continuation application of U.S. application Ser. No. 17/392,962, filed on Aug. 3, 2021, which is a continuation application of U.S. application Ser. No. 16/847,386 filed on Apr. 13, 2020, entitled of "METHOD AND SYSTEM FOR DETERMINING EQUIVALENCE OF DESIGN RULE MANUAL DATA AND DESIGN RULE CHECKING DATA", which claims the benefit of provisional application Ser. 62/908,017 filed on Sep. 30, 2019, entitled "METHOD AND SYSTEM FOR DRM-DRC EQUIVALENCE CHECK", the disclosure of which is hereby incorporated by reference in its entirety.

BACKGROUND

Design rules are geometric limitations imposed on semiconductor device designers to ensure their designs function properly. In detail, design rules include a plurality of parameters provided by manufacturers and are utilized by the designer to verify the correctness of a corresponding mask set.

Design rule manual (DRM) provides guidelines for constructing process mask set, and DRM data includes information of the guidelines. Experienced operator transforms the DRM data into design rule checking (DRC) data utilized in DRC which includes steps to determine if mask layout satisfies design rules. However, mis-transformation could happen from DRM data to DRC data.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

DETAILED DESCRIPTION

Figure 1A:
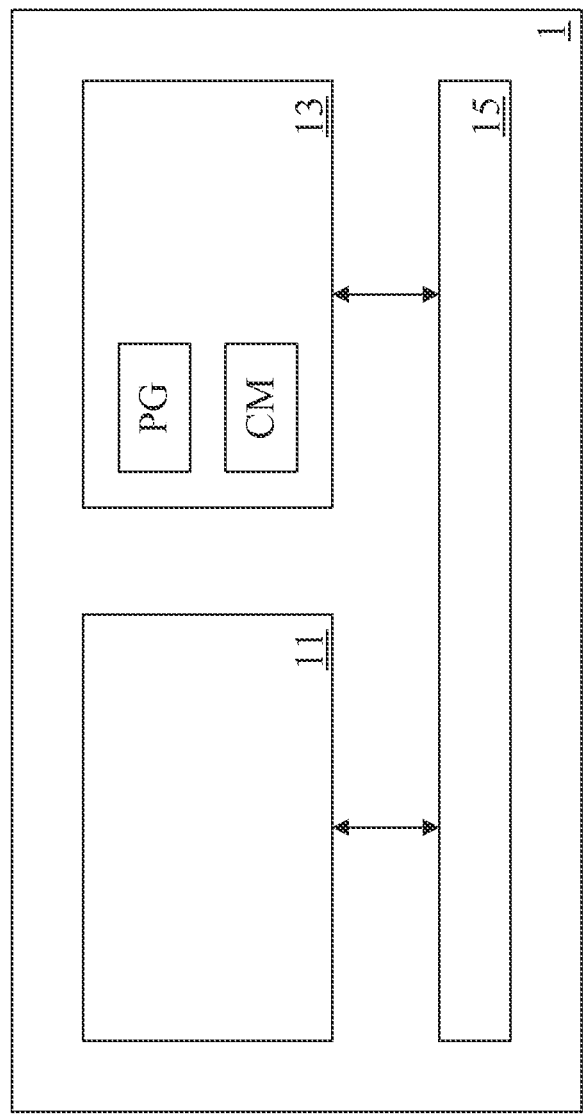
FIG. 1A is a block diagram of a system, in accordance with some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Embodiments of the present disclosure are discussed in detail below. It should be appreciated, however, that the present disclosure provides many applicable inventive concepts that can be embodied in a wide variety of specific contexts. The specific embodiments discussed are merely illustrative and do not limit the scope of the disclosure.

Further, spatially relative terms, such as "beneath," "below," "lower," "above," "upper," "lower," "left," "right" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly. It should be understood that when an element is referred to as being "connected to" or "coupled to" another element, it may be directly connected to or coupled to the other element, or intervening elements may be present.

In conventional procedure, design rule manual (DRM) data is transformed to design rule checking (DRC) data by an experienced operator. DRC data is then used during a DRC procedure for checking a layout, which corresponds to DRM data, to see if the design rules of the layout are violated. However, when the transformation between DRM and DRC is flawed, the result of checking the layout corresponding to DRM by DRC may be incorrect. Accordingly, the present disclosure provides method and system for determining equivalence of DRM data and DRC data.

FIG. 1A illustrates a block diagram of a system 1 according to some embodiments of the present disclosure. The system 1 includes a processor 11 and a storing unit 13. The processor 11 and the storing unit 13 are electrically coupled through a communication bus 15. The communication bus 15 may allow the processor 11 to execute a program PG stored in the storing unit 13. When executed, the program PG may generate one or more interrupts (e.g., software-interrupt) to cause the processor 11 to perform functions of the program PG for determining equivalence of DRM data and DRC data. The functions of the program PG will be further described hereinafter.

In some embodiments, a DRM data set S1 may be stored in a design rules database DB. The DRM data sets S1 may include manual design rules corresponding to a layout (not shown). The DRM data sets S1 may be transformed to a DRC data set S2 by an experienced operator. The DRC data set S2 corresponding to the DRM data set S1 may be stored in the database design rules data base DB.

Figure 1B:
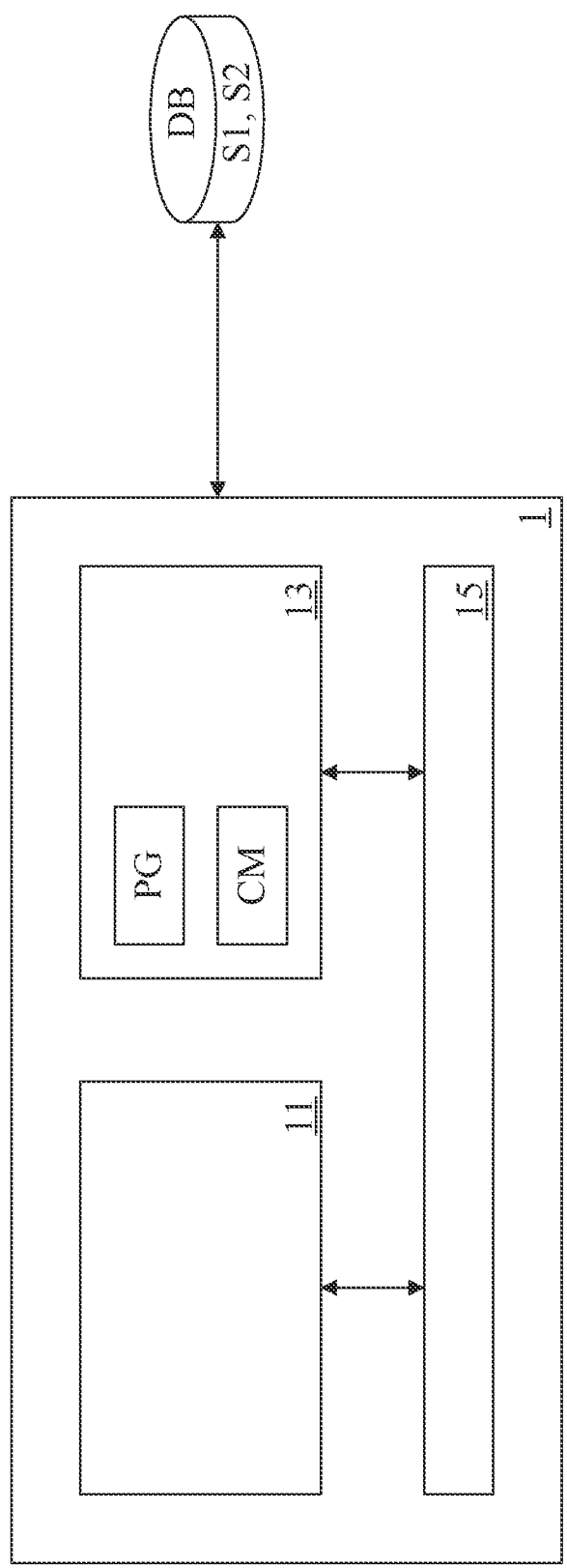
FIG. 1B is a block diagram of a system, in accordance with some embodiments of the present disclosure.
Figure 1C:
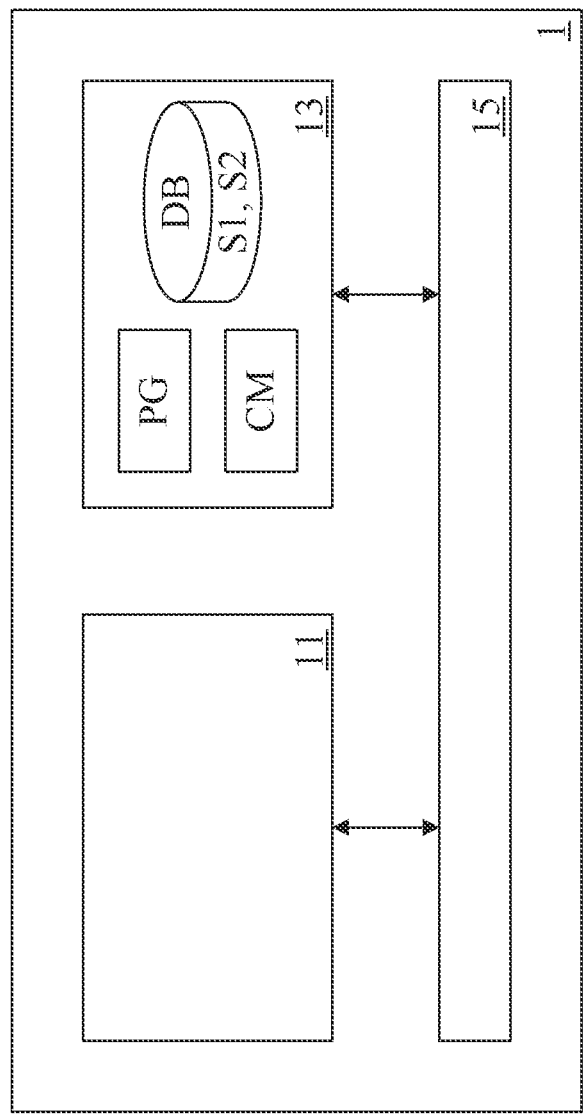
FIG. 1C is a block diagram of a system, in accordance with some embodiments of the present disclosure.

In some embodiments, the design rules database DB may be a network database as shown in FIG. 1B. In these embodiments, the processor 11 of the system 1 may retrieve DRM data set S1 and DRC data set S2 from the design rules database DB via a network interface (not shown) of the system 1. In some embodiments, the design rules database DB may be a local database stored in the storing unit 13 as shown in FIG. 1C. In these embodiments, the processor 11 of the system 1 may retrieve DRM data set S1 and DRC data set S2 from the design rules database DB via the communication bus 15.

Figure 2:
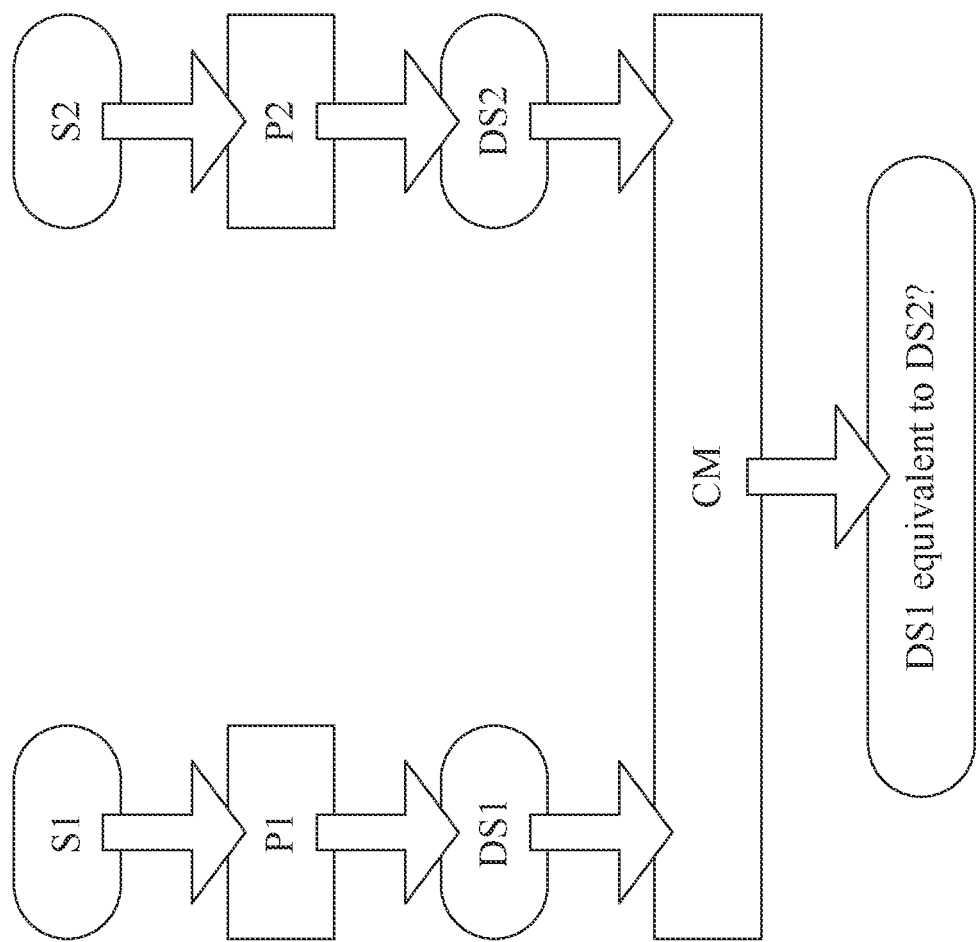
FIG. 2 is a schematic view of determining the equivalence of the DRM data set and the DRC data set, in accordance with some embodiments of the present disclosure.

FIG. 2 illustrates a schematic view of determining the equivalence of the DRM data set S1 and the DRC data set S2. In particular, before utilizing the DRM data set S1 and the DRC data set S2 during the subsequent processes, correctness of transformation between the DRM data set S1 and the DRC data set S2 may need to be checked. In other words, equivalence of the DRM data sets S1 and the DRC data sets S2 may need to be checked.

In some embodiments, the processor 11 may retrieve the DRM data set S1 and the DRC data set S2 from the design rules database DB. Next, for determining equivalence of the DRM data set S1 and the DRC data set S2, the DRM data set S1 and the DRC data set S2 may need to be conformed to the same data structure format. Therefore, the processor 11 may transform the DRM data set S1 and the DRC data set S2 into the same data structure format. In detail, the processor 11 may transform the DRM data set S1 into a first data structure node DS1. The processor 11 may transform the DRC data set S2 into a second data structure node DS2. The first data structure node DS1 and the second data structure node DS2 may have the same data structure format (e.g., tree data structure, array data structure, linked list data structure, stack data structure or queue data structure).

In some embodiments, the processor 11 may transform the DRM data set S1 into the first data structure node DS1 by a parser P1. In other words, the first data structure node DS1 may be generated for the DRM data set S1 corresponding to the layout by the parser P1. In particular, the parser P1 may include a compiler or an interpreter for transforming the DRM data set S1 into the first data structure node DS1. In some implementations, the processor 11 may input the DRM data set S1 into the parser P1, and obtain the first data structure node DS1 from the parser P1.

For example, the DRM data set S1 includes "Vertical width of PP>=0.1 (Except SRM)". The processor 11 of the system 1 inputs "Vertical width of PP>=0.1 (Except SRM)" into the parser P1, and obtains the first data structure node DS1 which includes the following tree data structure:

TDRM<1> Except TDRM<2>
   TDRM<1>=Vertical width of PP>=0.1
   TDRM<2>=SRM

In some embodiments, the processor 11 may transform the DRC data set S2 into the second data structure node DS2 by a parser P2. In other words, the second data structure node DS2 may be generated for the DRC data set S2 corresponding to the layout by the parser P2. In particular, the parser P2 may include a compiler or an interpreter for transforming the DRC data set S2 into the second data structure node DS2. In some implementations, the processor 11 may input the DRC data set S2 into the parser P2, and obtain the second data structure node DS2 from the parser P2. It should be noted that the parser P1 and the parser P2 may be different since the formats of DRM data set S1 and the DRC data set S2 are different.

For Example, the DRC data set S2 includes "(INTernal (ANGLE PP==0)<0.1 ABUT<90) NOT INSIDE SRM". The processor 11 of the system 1 inputs "(INTernal (ANGLE PP==0)<0.1 ABUT<90) NOT INSIDE SRM" into the parser P2, and obtains the second data structure node DS2 which includes the following tree data structure:

TDRC<1> NOT INSIDE TDRC<2>
   TDRC<1>=(INTernal (ANGLE PP==0)<0.1 ABUT<90)
   TDRC<2>=SRM Next, the processor 11 may determine whether a first content of the first data structure node DS1 and a second content of the second data structure node DS2 are equivalent. In some embodiments, the processor 11 may determine whether the first data structure node DS1 and the second data structure node DS2 are equivalent by applying a data structure node comparison model CM to the first data structure node DS1 and the second data structure node DS2. In some embodiments, the data structure node comparison model CM may be stored in the storing unit 13.

In some embodiments, the data structure node comparison model CM may include a formula model. The formula model may compare the content of data structure node of the DRM data set with the content of data structure node of the DRC data set to see if the contents of data structure nodes are equivalent. In particular, the formula model may be utilized to parse the first content of the first data structure node DS1 and to find if there is an equivalent content in the second data structure node DS2. If a content of the second data structure node DS2 is found to be equivalent to the first content of the first data structure node DS1, it means that the transformation from the DRM data set S1 to the DRC data set S2 is correct. Otherwise, error may occur when the DRM data set S1 is transformed to the DRC data set S2.

For example, according to the formula model, the processor 11 parses the first data structure node DS1 for obtaining the content "Vertical" of PP. Then, the processor 11 parses the second data structure node DS2 to find if there is any content in the second data structure node DS2 equivalent to "Vertical" of PP. In this example, the processor 11 parses the second data structure node DS2 and finds that the content "ANGLE PP==0" (i.e., 2 edges of PP at 0 degree means that a vertical of PP exists) of the second data structure node DS2 is equivalent to the content "Vertical" of PP of the first data structure node DS1.

Next, according to the formula model, the processor 11 parses the first data structure node DS1 for obtaining the content "Vertical width of PP>=0.1". Then, the processor 11 parses the second data structure node DS2 to find if there is any content in the second data structure node DS2 equivalent to "Vertical width of PP>=0.1" of the first data structure node DS1. It should be noted that, because the DRM data set represents the required design rule (e.g., the required design rule of width of A is "width of A is greater than 'n'") and the DRC data set represents the design rule that cannot be violated (e.g., the design rule of width of A should not be violated is "width of A is less than or equal to 'n'"), the content "Vertical width of PP>=0.1" in the DRM set should map to the content for "Vertical width of PP<0.1" in the DRC set. In other words, according to the formula model, the processor 11 should parse the second data structure node DS2 to find if there is any content in the second data structure node DS2 that corresponds to "Vertical width of PP<0.1".

In this example, the processor 11 parses the second data structure node DS2 and finds that the content "INTernal (ANGLE PP==0)<0.1" (i.e., the distance of the vertical side of PP less than 0.1) of the second data structure node DS2 corresponds to "Vertical width of PP<0.1" which is equivalent to "Vertical width of PP>=0.1" of the first data structure node DS1. In other words, the processor 11 parses the second data structure node DS2 and finds that the content "INTernal (ANGLE PP==0)<0.1" of the second data structure node DS2 is equivalent to "Vertical width of PP>=0.1" of the first data structure node DS1.

Accordingly, according to the comparison by the formula model, the processor 11 determines that the content of the first data structure node DS1 is equivalent to the content of the second data structure node DS2. Further, the processor 11 may determine that the first data structure node DS1 is equivalent to the second data structure node DS2 when all the contents of the first data structure node DS1 are equivalent to all the contents of the second data structure node DS2.

In some embodiments, the data structure node comparison model CM may include a Boolean algebra model which may parse the contents of data structure nodes into Boolean algebra expressions. In detail, the data structure node comparison model CM may be utilized to parse the first data structure node DS1 for generating a first Boolean algebra expression. The data structure node comparison model CM may be utilized to parse the second data structure node DS2 for generating a second Boolean algebra expression.

It should be noted that Boolean algebra expression may include any set with operators and variables that satisfy Boolean laws. For example, when the content of the first data structure node DS1 includes "Vertical width of PP>=0.1", the data structure node comparison model CM is utilized to parse "Vertical width of PP>=0.1" into the first Boolean algebra expression which includes "PP$\perp$>=0.1". When the content of the second data structure node DS1 includes "INTernal(ANGLE PP==0)<0.1 ABUT<90", the data structure node comparison model CM is utilized to parse "INTernal(ANGLE PP==0)<0.1 ABUT<90" into the second Boolean algebra expression which includes "PP$\perp$<0.1".

Next, according to the data structure node comparison model CM, the processor 11 may determine whether the first Boolean algebra expression of the first data structure node DS1 and the second Boolean algebra expression of the second data structure node DS2 are equivalent. If the first Boolean algebra expression of the first data structure node DS1 and the second Boolean algebra expression of the second data structure node DS2 are equivalent, it means that the transformation from the DRM data set S1 to the DRC data set S2 is correct. Otherwise, error may occur when the DRM data set S1 is transformed to the DRC data set S2.

For example, because the first Boolean algebra expression which includes "PP$\perp$>=0.1" is generated for the DRM data set and the DRM data set represents the required design rule, it means that the vertical width of PP of the corresponding layout should be greater than or equal to 0.1. Because the second Boolean algebra expression which includes "PP$\perp$<0.1" is generated for the DRC data set and the DRC data set represents the design rule that cannot be violated, it means that the vertical width of PP of the corresponding layout should not be less than 0.1.

Accordingly, according to the data structure node comparison model CM which includes the Boolean algebra model, the first Boolean algebra expression of the first data structure node DS1 is equivalent to the second Boolean algebra expression of the second data structure node DS2. Further, the processor 11 may determine that the first data structure node DS1 is equivalent to the second data structure node DS2 when all the Boolean algebra expressions of the first data structure node DS1 are equivalent to all the Boolean algebra expressions of the second data structure node DS2.

In some embodiments, data structure node comparison model CM may include a machine learning model which may receive two data structure nodes and determine whether the two data structure nodes are equivalent. In detail, the data structure node comparison model CM may be a trained machine learning model. The trained machine learning model is utilized to: receive the first data structure node DS1 and the second data structure node DS2; and determine whether the first data structure node DS1 and the second data structure node DS2 are equivalent. In other words, the processor 11 may input the first data structure node DS1 and the second data structure node DS2 into the data structure node comparison model CM, and the output of the data structure node comparison model CM may be a result of whether the first data structure node DS1 and the second data structure node DS2 are equivalent.

For example, when the content of the first data structure node DS1 includes "Vertical width of PP>=0.1" and the content of the second data structure node DS1 includes "INTernal(ANGLE PP==0)<0.1 ABUT<90", the data structure node comparison model CM is utilized to: receive "Vertical width of PP>=0.1" and "INTernal(ANGLE PP==0)<0.1 ABUT<90"; and determine whether "Vertical width of PP>=0.1" and "INTernal(ANGLE PP==0)<0.1 ABUT<90" are equivalent.

If the output of the data structure node comparison model CM shows positive, it means that the first data structure node DS1 and the second data structure node DS2 are equivalent. In other words, the transformation from the DRM data set S1 to the DRC data set S2 is correct. Otherwise, error may occur when the DRM data set S1 is transformed to the DRC data set S2.

For example, because the first data structure node DS1 which includes "Vertical width of PP>=0.1" is generated for the DRM data set and the DRM data set represents the required design rule, it means that the vertical width of PP of the corresponding layout should be greater than or equal to 0.1. Because the second data structure node DS2 which includes "INTernal(ANGLE PP==0)<0.1 ABUT<90" is generated for the DRC data set and the DRC data set represents the design rule that cannot be violated, it means that the vertical width of PP of the corresponding layout should not be less than 0.1.

Accordingly, according to the data structure node comparison model CM which includes the machine learning model, the content of the first data structure node DS1 and the content of the second data structure node DS2 are determined to be equivalent. Further, the processor 11 may determine that the first data structure node DS1 is equivalent to the second data structure node DS2 when all the contents of the first data structure node DS1 are equivalent to all the contents of the second data structure node DS2.

In some embodiments, before put to use, the machine learning model (i.e., the data structure node comparison model CM) may be trained first. In detail, because the data structure node comparison model CM should be used to receive the data structure nodes and output a result indicating the equivalence of the data structure nodes, a plurality of data structure nodes and corresponding result should be used as the training data for training the data structure node comparison model CM.

In particular, the plurality of data structure nodes may be separated into two sets which include a first data structure node set and a second data structure node set. Each training data includes: (1) one data structure node "N" of the first data structure node set; (2) one data structure node "M" of the second data structure node set; and (3) a result indicating whether the data structure nodes N" and "M" are equivalent. Accordingly, based on the machine learning scheme, the data structure node comparison model CM may be trained by the training data for indicating the equivalence of the data structure nodes.

In some embodiments, data structure node comparison model CM may include Natural Language Processing (NLP) model which may parse the contents of data structure nodes into NLP expressions. In detail, the data structure node comparison model CM may be utilized to parse the first data structure node DS1 for generating a first NLP expression. The data structure node comparison model CM may be utilized to parse the second data structure node DS2 for generating a second NLP expression.

It should be noted that each NLP expression may be transformed from the content of the data structure node. For example, when the content of the first data structure node DS1 includes "Vertical width of PP>=0.1", the data structure node comparison model CM is utilized to analyze "Vertical width of PP>=0.1" and transform "Vertical width of PP>=0.1" into the first NLP expression which includes the following sets:

content=[Vertical,width,of,PP,>=,0.1]

property of content=[sub c,main c,prep,layer,comparing operator,value]

wherein sub c represents sub-command, main c represents main command and prep represents preposition.

When the content of the second data structure node DS2 includes "INTernal(ANGLE PP==0)<0.1 ABUT<90", the data structure node comparison model CM is utilized to analyze "INTernal(ANGLE PP==0)<0.1 ABUT<90" and transform "INTernal(ANGLE PP==0)<0.1 ABUT<90" into the second NLP expression which includes the following sets:

content=[INTernal,(,ANGLE,PP,==,0,),<,0.1,ABUT, <,90]

property of content=[main c,L-p,sub c,layer,sub-comparing operator,sub-value,R-p,comparing operator,value,adverb,comparing operator,value]

wherein L-p represents left parenthesis, R-p represents right parenthesis, sub c represents sub-command and main c represents main command.

Next, according to the data structure node comparison model CM, the processor 11 may determine whether the first NLP expression of the first data structure node DS1 and the second NLP expression of the second data structure node DS2 are equivalent. If the first NLP expression of the first data structure node DS1 and the second NLP expression of the second data structure node DS2 are equivalent, it means that the transformation from the DRM data set S1 to the DRC data set S2 is correct. Otherwise, error may occur when the DRM data set S1 is transformed to the DRC data set S2.

For example, when the first NLP expression includes:

content=[Vertical,width,of,PP,>=,0.1]

property of content=[sub c,main c,prep,layer,comparing operator,value]

and the second NLP expression includes:

content=[INTernal,(,ANGLE,PP,==,0,),<,0.1,ABUT, <,90]

property of content=[main c,L-p,sub c,layer,sub-comparing operator,sub-value,R-p,comparing operator,value,adverb,comparing operator,value]

the data structure node comparison model CM can be used to map content of the first NLP expression to content of the second NLP expression while property of content of the first NLP expression and property of content of the second NLP expression are related.

In some implementations, since property "main c" of the first NLP expression and property "main c" of the second NLP expression are the same, content "width" corresponding to property "main c" of the first NLP expression is mapped to content "INTernal" corresponding to property "main c" of the second NLP expression.

In some implementations, since property "sub c" of the first NLP expression and properties "sub c & sub-comparing operator & sub-value" of the second NLP expression are related, content "Vertical" corresponding to property "sub c" of the first NLP expression is mapped to content "ANGLE==0" corresponding to properties "sub c & sub-comparing operator & sub-value" of the second NLP expression.

Accordingly, after mapping the first NLP expression to the second NLP expression, the processor 11 can determine whether the first NLP expression of the first data structure node DS1 and the second NLP expression of the second data structure node DS2 are equivalent. Further, the processor 11 may determine that the first data structure node DS1 is equivalent to the second data structure node DS2 when all the NLP expressions of the first data structure node DS1 are equivalent to all the NLP expressions of the second data structure node DS2.

In some embodiment, data structure node comparison model CM may include table look-up model which may parse the contents of data structure nodes into tables. In detail, the data structure node comparison model CM may be utilized to parse the first data structure node DS1 for generating a first table. The data structure node comparison model CM may be utilized to parse the second data structure node DS2 for generating a second table.

It should be noted that each table may be transformed from the content of the data structure node. For example, when the content of the first data structure node DS1 includes "Vertical width of PP>=0.1", the data structure node comparison model CM is utilized to analyze "Vertical width of PP>=0.1" and transform "Vertical width of PP>=0.1" into the below TDRM table:

| TDRM Table | Layer | Command | constrain | Value |
|---|---|---|---|---|
| TDRM<1> | PP | Vertical width | >= | 0.1 |

In particular, the content of the first data structure node DS1 may be parsed into the TDRM table which includes identified items of "Layer", "command", "constrain" and "value". "PP" of "Vertical width of PP>=0.1" is parsed and filled into "Layer" item. "Vertical width" of "Vertical width of PP>=0.1" is parsed and filled into "command" item. ">=" of "Vertical width of PP>=0.1" is parsed and filled into "constrain" item. "0.1" of "Vertical width of PP>=0.1" is parsed and filled into "value" item.

When the content of the second data structure node DS2 includes "INTernal (ANGLE PP==0)<0.1", the data structure node comparison model CM is utilized to analyze "INTernal (ANGLE PP==0)<0.1" and transform "INTernal (ANGLE PP==0)<0.1" into the below TDRC table:

| TDRC Table | Layer | Command | constrain | Value |
|---|---|---|---|---|
| TDRC<1> | PP | INTernal (ANGLE == 0) | < | 0.1 |

In particular, the content of the second data structure node DS1 may be parsed into the TDRC table which includes identified items of "Layer", "command", "constrain" and "value". "PP" of "INTernal (ANGLE PP==0)<0.1" is parsed and filled into "Layer" item. "INTernal (ANGLE==0)" of "INTernal (ANGLE PP==0)<0.1" is parsed and filled into "command" item. "<" of "INTernal (ANGLE PP==0)<0.1" is parsed and filled into "constrain" item. "0.1" of "INTernal (ANGLE PP==0)<0.1" is parsed and filled into "value" item.

Next, in some embodiments, the storing unit 13 may store a look-up table as below:

| Item | DRM term | DRC term |
|---|---|---|
| Layer 1 | PP | PP |
| Layer 2 | SRM | SRM |
| Layer 3 | . . . | . . . |
| Command 1 | Vertical width | INTernal(ANGLE == 0) |
| Command 2 | Horizontal width | INTernal(ANGLE == 90) |
| Command 3 | . . . | . . . |
| Constrain 1 | >= | < |
| Constrain 2 | = | != |
| . . . | . . . | . . . |

In particular, the look-up table includes mapping relations between the terms used in DRM and the terms used in DRC. More specifically, according to item "Layer 1" of the look-up table, term "PP" described in DRM maps to term "PP" described in DRC. According to item "Layer 2" of the look-up table, term "SRM" described in DRM maps to term "SRM" described in DRC. According to item "Command 1" of the look-up table, term "Vertical width" described in DRM maps to term "INTernal(ANGLE)==0" described in DRC. According to item "Command 2" of the look-up table, term "Horizontal width" described in DRM maps to term "INTernal(ANGLE)==90" described in DRC. According to item "Constrain 1" of the look-up table, term ">=" described in DRM maps to term "<" described in DRC. According to item "Constrain 2" of the look-up table, term "=" described in DRM maps to term "!=" described in DRC.

Accordingly, by checking the mapping relations of the look-up table, the processor 11 may determine whether the TDRM table of the first data structure node DS1 and the TDRC table of the second data structure node DS2 are equivalent. More specifically, the processor 11 may check whether items of the TDRM table and items of the TDRC table are equivalent according to the look-up table.

In these embodiments, the TDRM table of the first data structure node DS1 and the TDRC table of the second data structure node DS2 are determined equivalent when the processor 11 checks that: (1) content of item "Layer" (i.e., "PP") of the TDRM table and content of item "Layer" (i.e., "PP") of the TDRC table are equivalent according to mapping relation "Layer 1" of the look-up table; (2) content of item "command" (i.e., "Vertical width") of the TDRM table and content of item "command" (i.e., "INTernal(AN-GEL==0)") of the TDRC table are equivalent according to mapping relation "Command 1" of the look-up table; (3) content of item "constrain" (i.e., ">=") of the TDRM table and content of item "constrain" (i.e., "<") of the TDRC table are equivalent according to mapping relation "Constrain 1" of the look-up table; and (4) content of item "value" (i.e., "0.1") of the TDRM table and content of item "value" (i.e., "0.1") of the TDRC table are equivalent.

Accordingly, according to the data structure node comparison model CM which includes the table look-up model, the TDRM table of the first data structure node DS1 is equivalent to the TDRC table of the second data structure node DS2. Further, the processor 11 may determine that the first data structure node DS1 is equivalent to the second data structure node DS2 when all the TDRM tables of the first data structure node DS1 are equivalent to all the TDRC tables of the second data structure node DS2.

It shall be particularly appreciated that the processors mentioned in the above embodiments may be a central processing unit (CPU), other hardware circuit elements capable of executing relevant instructions, or combination of computing circuits that are well-known by those skilled in the art based on the above disclosures.

Moreover, the storing units mentioned in the above embodiments may include memories, such as ROM, RAM, etc., or storing device, such as flash memory, HDD, SSD, etc., for storing data. Further, the communication buses mentioned in the above embodiments may include a communication interface for transferring data between the elements, such as the processor, the storing unit, the sensor and the alert element, and may include electrical bus interface, optical bus interface or even wireless bus interface. However, such description is not intended to limit the hardware implementation embodiments of the present disclosure.

Figure 3:
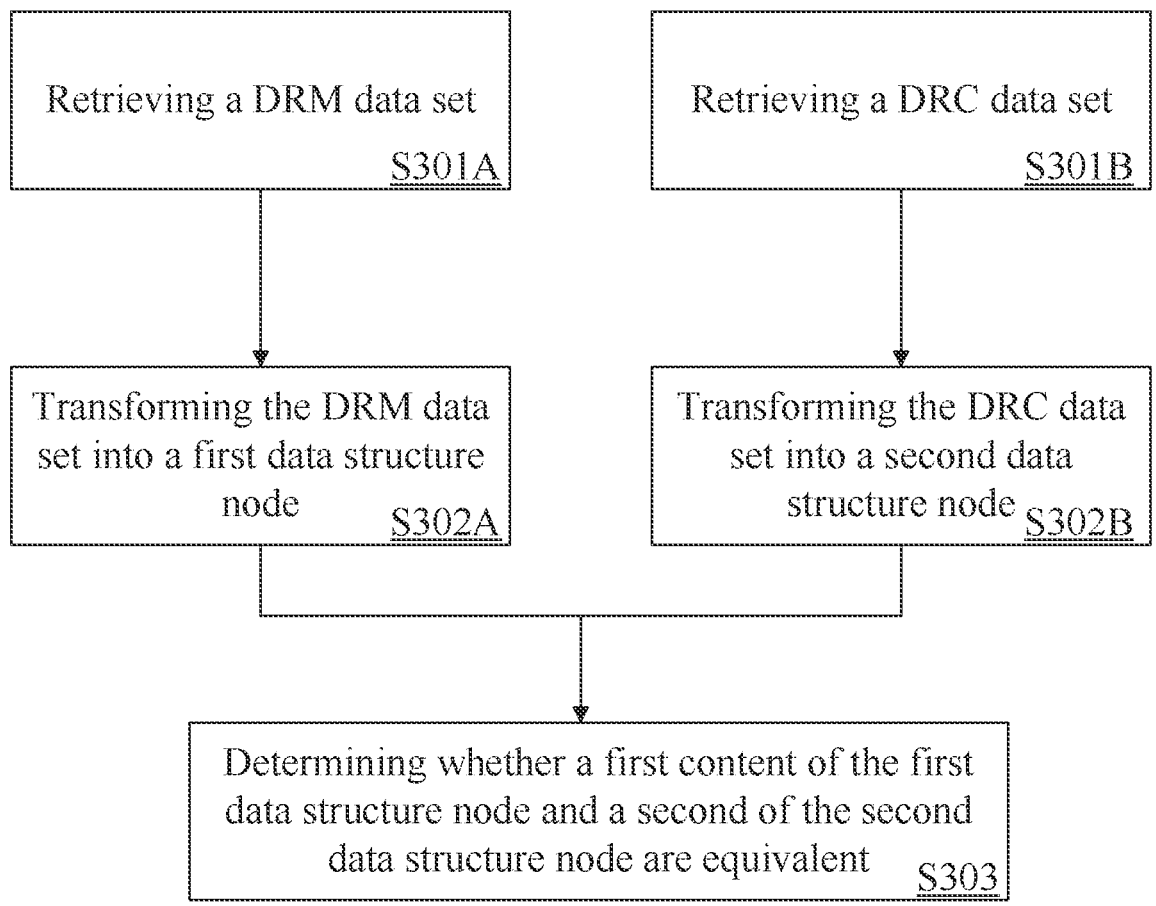
FIG. 3 is a flowchart diagram, in accordance with some embodiments of the present disclosure.

Some embodiments of the present disclosure include a method for determining equivalence of DRM data and DRC data, and a flowchart diagram thereof is as shown in FIG. 3. The method of some embodiments is implemented by a system (e.g., the system 1 of the aforesaid embodiments). Detailed operations of the method are as follows.

Referring to FIG. 3, operation S301A is executed to retrieve a DRM data set. Operation S301B is executed to retrieve a DRC data set. In some embodiments, the DRC data set may be transformed from the DRM data set. In some embodiments, the DRM data set and the DRC data set may include data of design rules which correspond to the same layout.

Operation S302A is executed to transform the DRM data set into a first data structure node. In other words, the first data structure node may be generated for the DRM data set. Operation S302B is executed to transform the DRC data set into a second data structure node. In other words, the second data structure node may be generated for the DRC data set. In some embodiments, the first data structure node and the second data structure node may have the same data structure format (e.g., tree data structure).

Operation S303 is executed to determine whether a first content of the first data structure node and a second content of the second data structure node are equivalent. In some embodiments, the first data structure node and the second data structure node are determined equivalent or not by applying a data structure node comparison model to the first data structure node and the second data structure node.

If the first content of the first data structure node and the second content of the second data structure node are equivalent according to the data structure node comparison model, it means that the transformation from the DRM data set to the DRC data set is correct. Otherwise, error may occur when the DRM data set is transformed to the DRC data set.

Some embodiments of the present disclosure include a method for determining equivalence of DRM data and DRC data, and flowchart diagrams thereof are as shown in FIGS.

4A to 4G. The method of some embodiments is implemented by a system (e.g., the system 1 of the aforesaid embodiments). Detailed operations of the method are as follows.

Figure 4A:
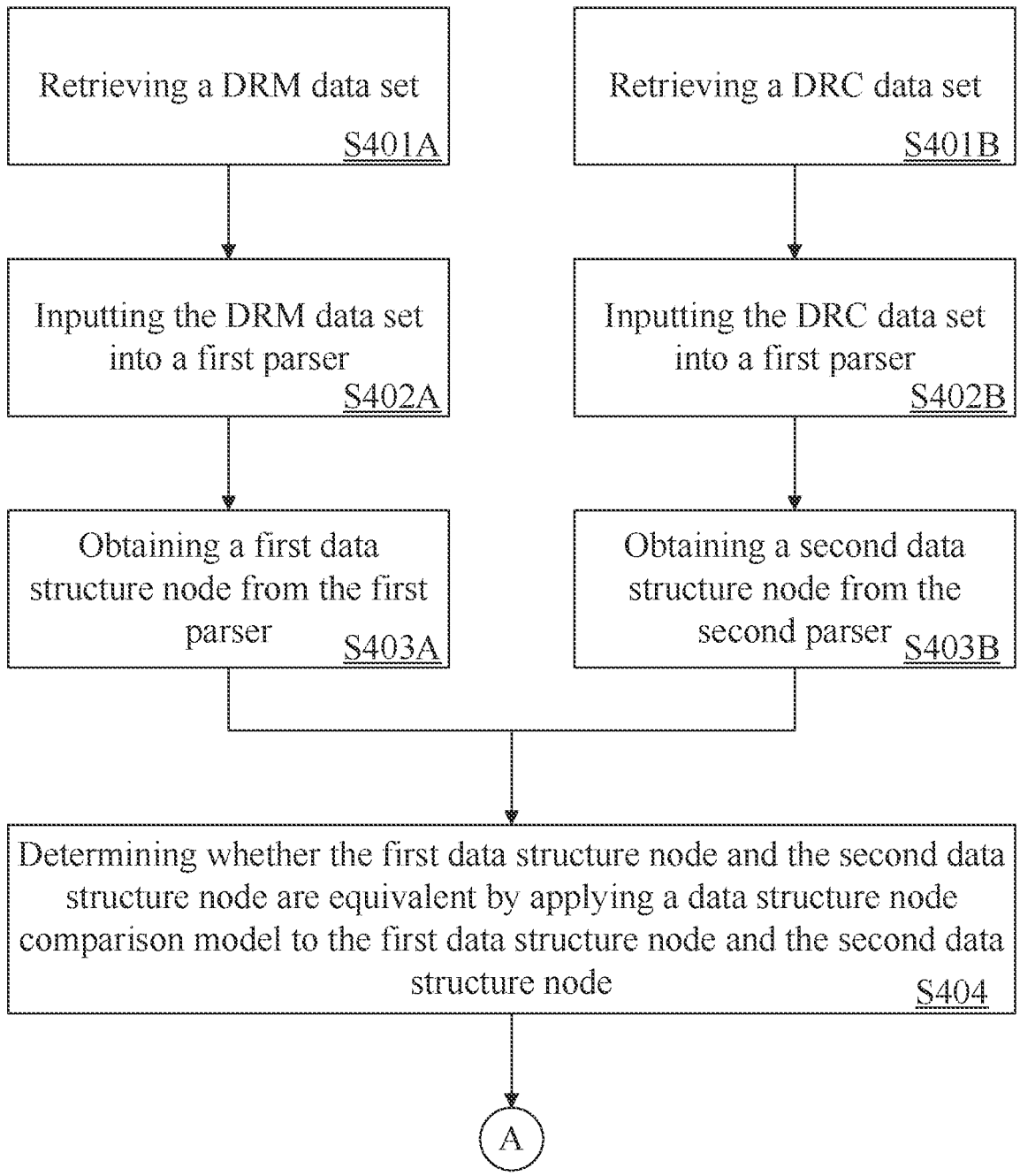
FIGS. 4A to 4G are flowchart diagrams, in accordance with some embodiments of the present disclosure.

Referring to FIG. 4A, operation S401A is executed to retrieve a DRM data set. Operation S401B is executed to retrieve a DRC data set. In some embodiments, the DRC data set may be transformed from the DRM data set. In some embodiments, the DRM data set and the DRC data set may include data of design rules which correspond to the same layout.

Operation S402A is executed to input the DRM data set into a first parser. Operation S403A is executed to obtain a first data structure node from the first parser. Operation S402B is executed to input the DRC data set into a second parser. Operation S403B is executed to obtain a second data structure node from the second parser. Operation S404 is executed to determine whether the first data structure node and the second data structure node are equivalent by applying a data structure node comparison model to the first data structure node and the second data structure node.

If the first data structure node and the second data structure node are equivalent according to the data structure node comparison model, it means that the transformation from the DRM data set to the DRC data set is correct. Otherwise, error may occur when the DRM data set is transformed to the DRC data set.

Figure 4B:
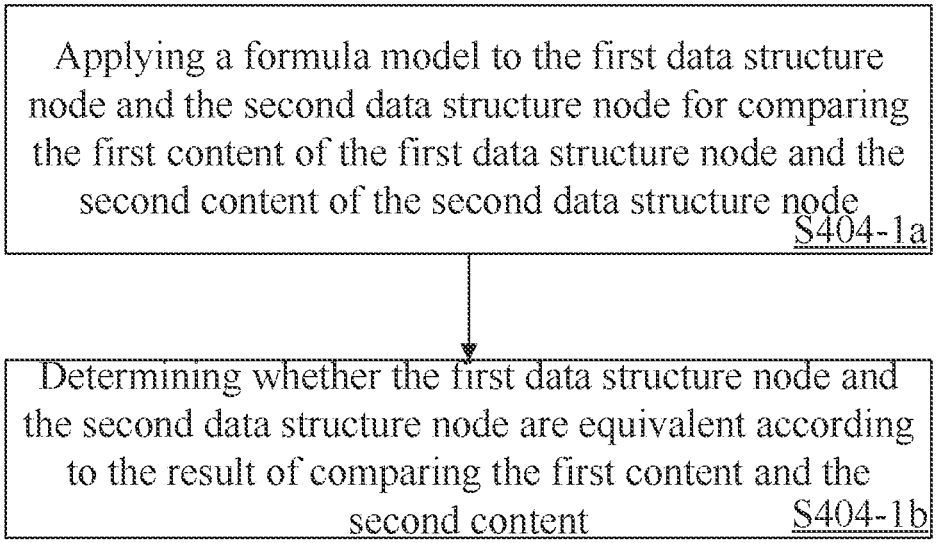

In some embodiments, operation S404 may be detailed as operations shown in FIG. 4B. In detail, the data structure node comparison model may include a formula model. Operation S404-1a is executed to apply the formula model to the first data structure node and the second data structure node for comparing a first content of the first data structure node and the second content of the second data structure node. Operation S404-1b is executed to determine whether the first data structure node and the second data structure node are equivalent according to the result of comparing the first content and the second content.

Based on the formula model, if the first content and the second content are determined to be equivalent, it means that the first data structure node and the second data structure node are equivalent which means that the transformation from the DRM data set to the DRC data set is correct. Otherwise, error may occur when the DRM data set is transformed to the DRC data set.

Figure 4C:
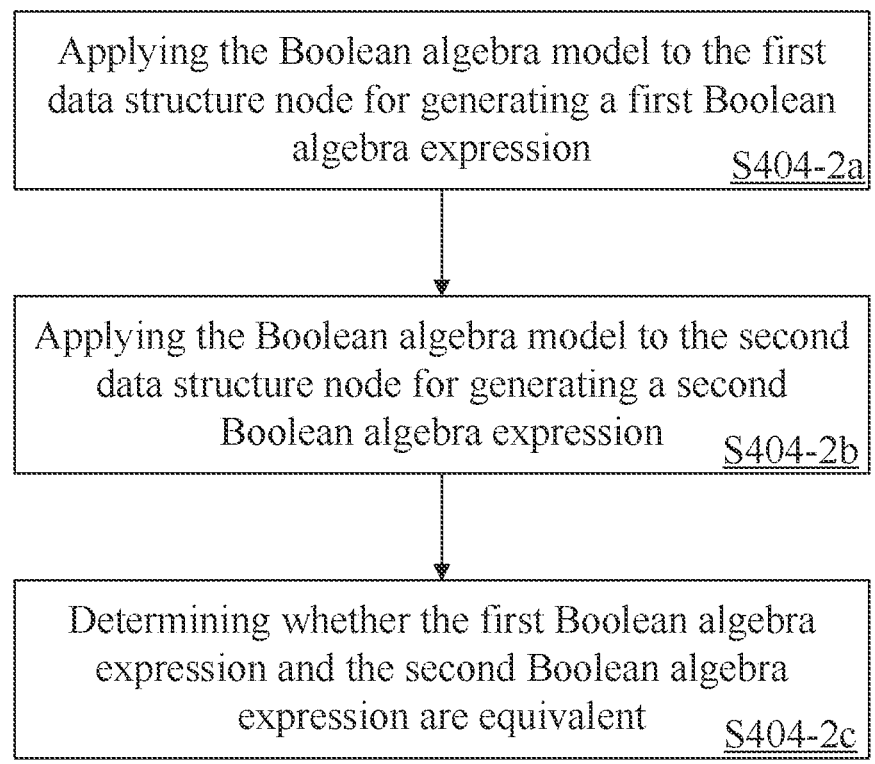

In some embodiments, operation S404 may be detailed as operations shown in FIG. 4C. In detail, the data structure node comparison model may include a Boolean algebra model. Operation S404-2a is executed to apply the Boolean algebra model to the first data structure node for generating a first Boolean algebra expression. In other words, the Boolean algebra model may parse the first data structure node for generating the first Boolean algebra expression. Operation S404-2b is executed to apply the Boolean algebra model to the second data structure node for generating a second Boolean algebra expression. In other words, the Boolean algebra model may parse the second data structure node for generating the second Boolean algebra expression.

Operation S404-2c is executed to determine whether the first Boolean algebra expression of the first data structure node and the second Boolean algebra expression of the second data structure node are equivalent according to the data structure node comparison model. If the first Boolean algebra expression of the first data structure node and the second Boolean algebra expression of the second data structure node are equivalent, it means that the transformation from the DRM data set to the DRC data set is correct. Otherwise, error may occur when the DRM data set is transformed to the DRC data set.

Figure 4D:
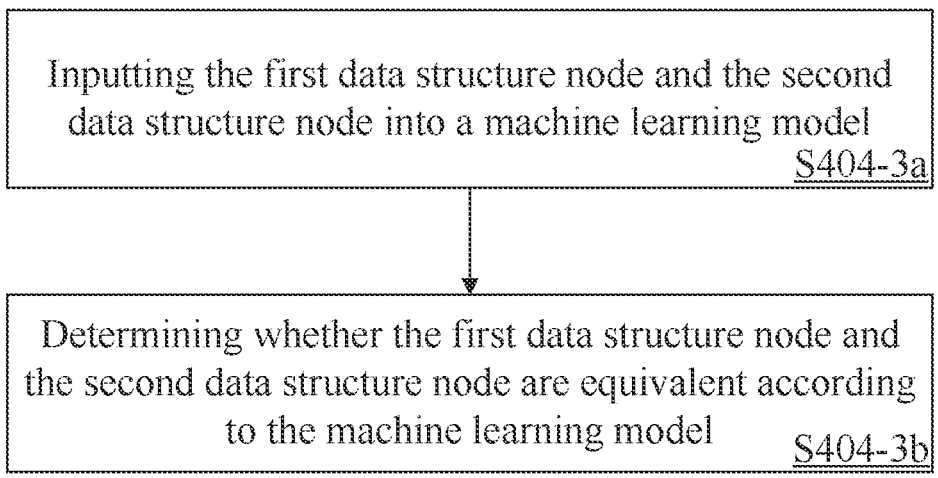

In some embodiments, operation S404 may be detailed as operations shown in FIG. 4D. In detail, the data structure node comparison model may include a machine learning model. Operation S404-3a is executed to input the first data structure node and the second data structure node into the data structure node comparison model which include the machine learning model. Operation S404-3b is executed to determine whether the first data structure node and the second data structure node are equivalent according to the machine learning model.

Based on the machine learning model, if the output of the data structure node comparison model shows positive, it means that the first data structure node and the second data structure node are equivalent which means that the transformation from the DRM data set to the DRC data set is correct. Otherwise, error may occur when the DRM data set is transformed to the DRC data set.

Figure 4E:
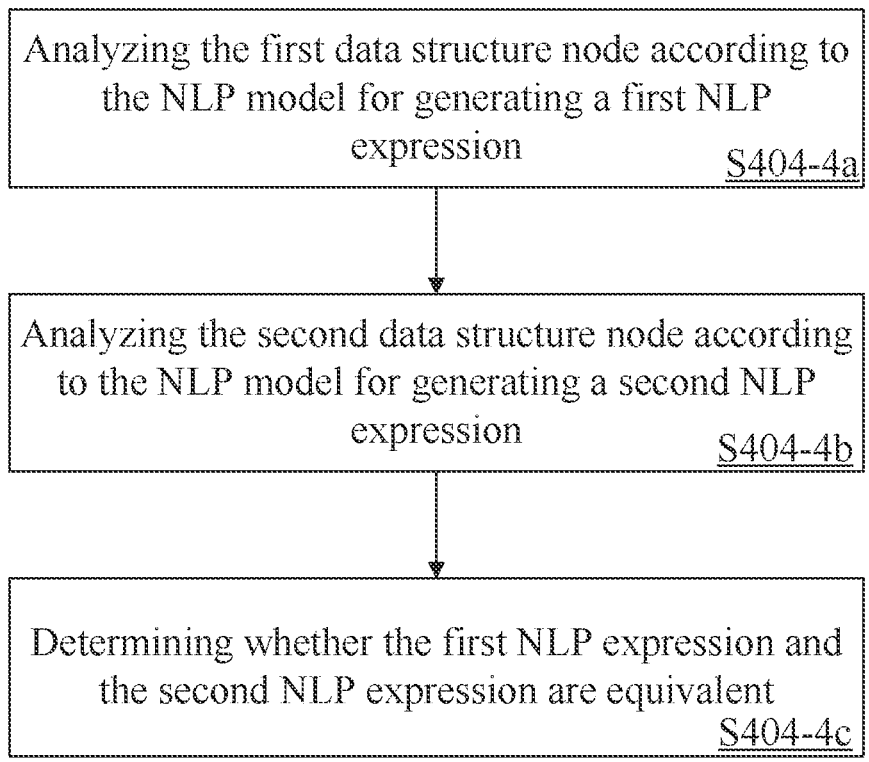

In some embodiments, operation S404 may be detailed as operations shown in FIG. 4E. In detail, the data structure node comparison model may include a NLP model. Operation S404-4a is executed to analyze the first data structure node according to the NLP model for generating a first NLP expression. In other words, the NLP model may parse the first data structure node for generating the first NLP expression. Operation S404-4b is executed to analyze the second data structure node according to the NLP model for generating a second NLP expression. In other words, the NLP model may parse the second data structure node for generating the second NLP expression.

Operation S404-4c is executed to determine whether the first NLP expression of the first data structure node and the second NLP expression of the second data structure node are equivalent according to the data structure node comparison model. If the first NLP expression of the first data structure node and the second NLP expression of the second data structure node are equivalent, it means that the transformation from the DRM data set to the DRC data set is correct. Otherwise, error may occur when the DRM data set is transformed to the DRC data set.

Figure 4F:
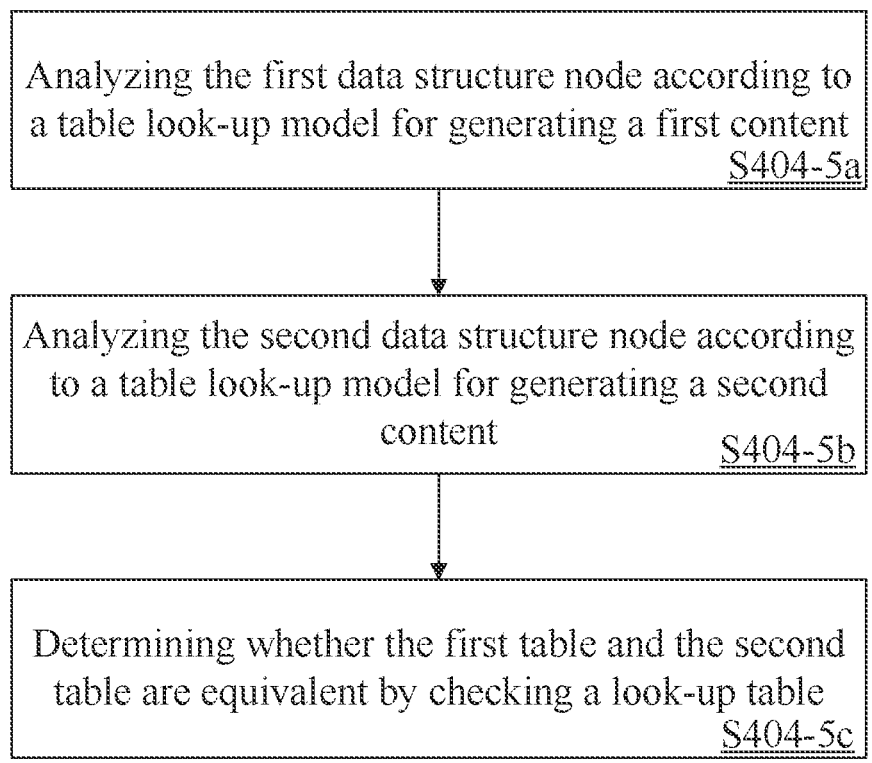

In some embodiments, operation S404 may be detailed as operations shown in FIG. 4F. In detail, the data structure node comparison model may include a table look-up model. Operation S404-5a is executed to analyze the first data structure node according to the table look-up model for generating a first table. In other words, the table look-up model may parse the first data structure node for generating the first table. Operation S404-5b is executed to analyze the second data structure node according to the table look-up model for generating a second table. In other words, the table look-up model may parse the second data structure node for generating the second table.

Operation S404-5c is executed to determine whether the first table of the first data structure node and the second table expression of the second data structure node are equivalent according to the data structure node comparison model. If the first table of the first data structure node and the second table of the second data structure node are equivalent, it means that the transformation from the DRM data set to the DRC data set is correct. Otherwise, error may occur when the DRM data set is transformed to the DRC data set.

Figure 4G:
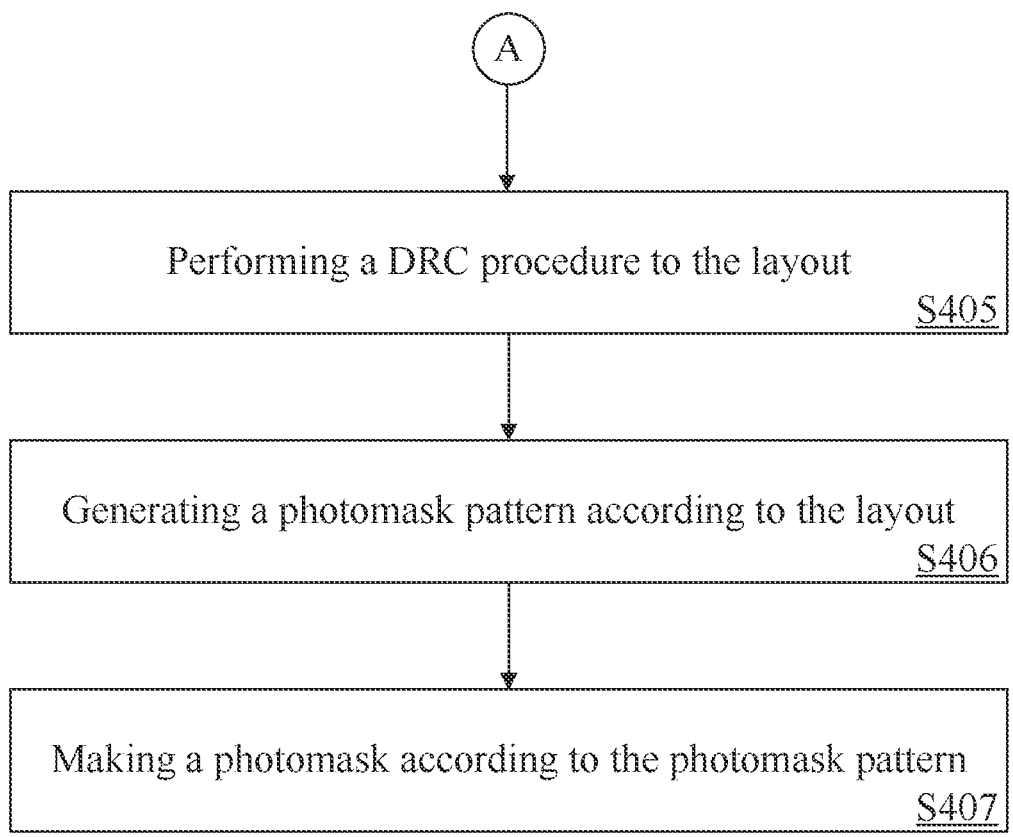

Referring to FIG. 4G, in some embodiments, when all the DRM data sets and the corresponding DRC data sets are determined equivalent, operation S405 is executed to perform a DRC procedure to the layout which corresponds to the DRM data sets and the DRC data sets. After the DRC procedure, operation S406 is executed to generate a photomask pattern according to the layout. Operation S407 is executed to make photomask according to the photomask pattern.

The method described in each of the above embodiments may be implemented by a computer programs including a plurality of codes. The computer program is stored in a non-transitory computer readable storage medium. When the computer programs loaded into an electronic computing apparatus (e.g., the system mentioned in the above embodiments), the computer program executes the method as described in the above embodiment. The non-transitory computer readable storage medium may be an electronic product, e.g., a read only memory (ROM), a flash memory, a floppy disk, a hard disk, a compact disk (CD), a mobile disk, a database accessible to networks, or any other storage media with the same function and well known to those of ordinary skill in the art.

Some embodiments of the present disclosure provide a method for determining the equivalence of the DRM data set and the DRC data set. The method includes the operations of: retrieving a DRM data set and a DRC data set, wherein the DRM data set corresponds to the DRC data set; transforming the DRM data set and the DRC data set into a first data structure node and a second data structure node respectively; and determining whether a first content of the first data structure node and a second content of the second data structure node are equivalent.

Some embodiments of the present disclosure provide a method for determining the equivalence of the DRM data set and the DRC data set. The method includes the operations of: generating a first data structure node for a DRM data set corresponding to a layout; generating a second data structure node for a DRC data set corresponding to the layout; and determining whether the first data structure node and the second data structure node are equivalent by applying a data structure node comparison model to the first data structure node and the second data structure node.

Some embodiments of the present disclosure provide a system for determining the equivalence of the DRM data set and the DRC data set. The system includes a processor and a storing unit. The processor and the storing unit are connected electrically. The storing unit stores a data structure node comparison model and a program. When executed, the program causes the processor to: retrieve a DRM data set and a DRC data set, wherein the DRM data set corresponds to the DRC data set; transform the DRM data set and the DRC data set into a first data structure node and a second data structure node respectively; and determine whether the first data structure node and the second data structure node are equivalent according to the data structure node comparison model.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

What is claimed is:

1. A method, comprising:
   retrieving a design rules manual (DRM) data set and a design rules check (DRC) data set, wherein the DRM data set corresponds to the DRC data set;
   transforming the DRM data set and the DRC data set into a first data structure node and a second data structure node respectively; and
   determining whether a first content of the first data structure node and a second content of the second data structure node are equivalent according to a data structure node comparison model,
   wherein the first content and the second content include formula model parsed contents, Boolean algebra expressions, natural language processing (NLP) expressions or tables.

2. The method of claim 1, wherein the DRM data set and the DRC data set are retrieved from a design rules database.

3. The method of claim 1, wherein the DRM data set and the DRC data set are transformed into the first data structure node and the second data structure node by at least one parser.

4. The method of claim 1, wherein the data structure node comparison model includes a formula model, and determining whether the first content of the first data structure node and the second content of the second data structure node are equivalent according to the data structure node comparison model further comprises:
   applying the formula model to the first data structure node and the second data structure node for generating a first formula model parsed content of the first data structure node and a second formula model parsed content of the second data structure node; and
   determining whether the first data structure node and the second data structure node are equivalent according to the result of comparing the first content and the second content.

5. The method of claim 1, wherein the data structure node comparison model includes a Boolean algebra model, and determining whether the first content of the first data structure node and the second content of the second data structure node are equivalent according to the data structure node comparison model further comprises:
   applying the Boolean algebra model to the first data structure node for generating the first content, wherein the first content includes a first Boolean algebra expression;
   applying the Boolean algebra model to the second data structure node for generating the second content, wherein the second content includes a second Boolean algebra expression; and
   determining whether the first Boolean algebra expression and the second Boolean algebra expression are equivalent.

6. The method of claim 1, wherein the data structure node comparison model includes a NLP model, and determining whether the first content of the first data structure node and the second content of the second data structure node are equivalent according to the data structure node comparison model further comprises:
   analyzing the first data structure node according to the NLP model for generating the first content, wherein the first content includes a first NLP expression;
   analyzing the second data structure node according to the NLP model for generating the second content, wherein the second content includes a second NLP expression; and determining whether the first NLP expression and the second NLP expression are equivalent.

7. The method of claim 1, wherein the data structure node comparison model includes a table look-up model, and determining whether the first content of the first data structure node and the second content of the second data structure node are equivalent according to the data structure node comparison model further comprises:
analyzing the first data structure node according to the table look-up model for generating the first content, wherein the first content includes a first table;
analyzing the second data structure node according to the table look-up model for generating the second content, wherein the second content includes a second table; and
determining whether the first table and the second table are equivalent by checking a look-up table.

8. A system, comprising:
a processor; and
a storing unit storing a data structure node comparison model and a program that, when being executed, causes the processor to:
retrieve a design rules manual (DRM) data set and a design rules check (DRC) data set, wherein the DRM data set corresponds to the DRC data set;
transform the DRM data set and the DRC data set into a first data structure node and a second data structure node respectively; and
determine whether a first content of the first data structure node and a second content of the second data structure node are equivalent according to the data structure node comparison model, wherein the first content and the second content include formula model parsed contents, Boolean algebra expressions, natural language processing (NLP) expression or tables.

9. The system of claim 8, wherein the processor transforms the DRM data set into the first data structure node by a parser, and transforms the DRC data set into the second data structure node by another parser.

10. The system of claim 8, wherein the first data structure node and the second data structure node have a same data structure format.

11. The system of claim 8, wherein the processor retrieves the DRM data set and the DRC data set from a local database stored in the storing unit.

12. A method, comprising:
retrieving a design rules manual (DRM) data set corresponding to a layout and a design rules check (DRC) data set corresponding to the layout;
transforming the DRM data set and the DRC data set into a first data structure node and a second data structure node respectively;
determining whether a first content of the first data structure node and a second content of the second data structure node are equivalent; and
generating a photomask pattern according to the layout when determining the first content of the first data structure node and the second content of the second data structure node are equivalent,
wherein the first content and the second content include formula model parsed contents, Boolean algebra expressions, natural language processing (NLP) expressions or tables.

13. The method of claim 12, wherein the first data structure node and the second data structure node have a same data structure format.

14. The method of claim 12, wherein the DRM data set and the DRC data set are retrieved from a design rules database.

15. The method of claim 12, wherein the DRM data set and the DRC data set are transformed into the first data structure node and the second data structure node by at least one parser.

16. The method of claim 12, wherein determining whether the first content of the first data structure node and the second content of the second data structure node are equivalent further comprises:
applying a formula model to the first data structure node and the second data structure node for generating a first formula model parsed content of the first data structure node and a second formula model parsed content of the second data structure node; and
determining whether the first data structure node and the second data structure node are equivalent according to the result of comparing the first content and the second content.

17. The method of claim 12, wherein determining whether the first content of the first data structure node and the second content of the second data structure node are equivalent further comprises:
applying a Boolean algebra model to the first data structure node for generating the first content, wherein the first content includes a first Boolean algebra expression;
applying the Boolean algebra model to the second data structure node for generating the second content, wherein the second content includes a second Boolean algebra expression; and
determining whether the first Boolean algebra expression and the second Boolean algebra expression are equivalent.

18. The method of claim 12, wherein determining whether the first content of the first data structure node and the second content of the second data structure node are equivalent further comprises:
analyzing the first data structure node according to a NLP model for generating the first content, wherein the first content includes a first NLP expression;
analyzing the second data structure node according to the NLP model for generating the second content, wherein the second content includes a second NLP expression; and
determining whether the first NLP expression and the second NLP expression are equivalent.

19. The method of claim 12, wherein determining whether the first content of the first data structure node and the second content of the second data structure node are equivalent further comprises:
analyzing the first data structure node according to a table look-up model for generating the first content, wherein the first content includes a first table;
analyzing the second data structure node according to the table look-up model for generating the second content, wherein the second content includes a second table; and
determining whether the first table and the second table are equivalent by checking a look-up table.

20. The method of claim 12, further comprising:
making a photomask according to the photomask pattern.

* * * * *